May 9, 1967 G. A. ARGABRITE 3,319,258
HEAT POWERED THERMOGRAPH
Filed Aug. 2, 1965
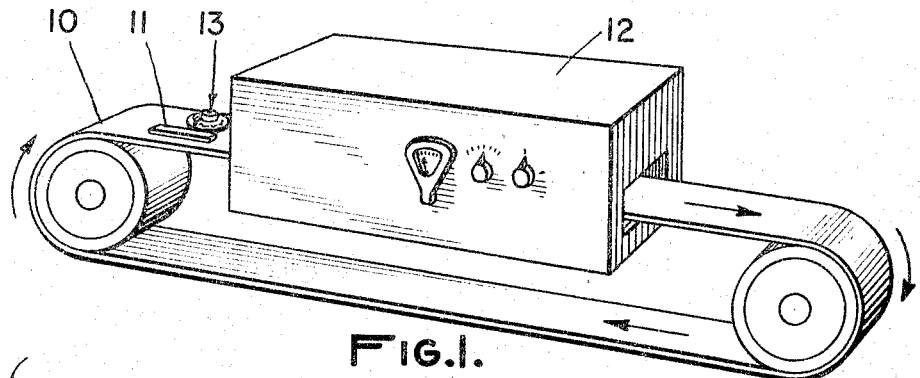
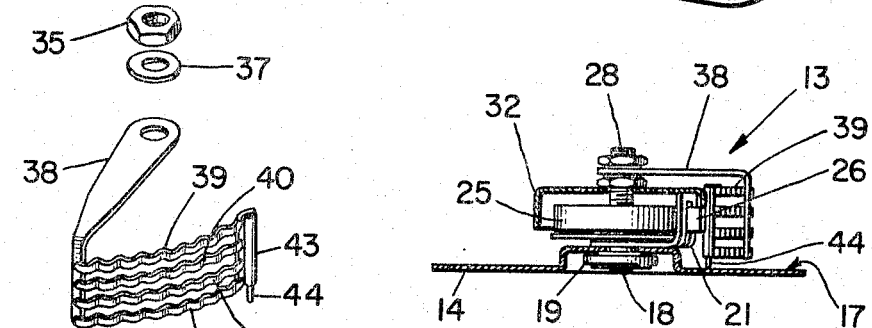
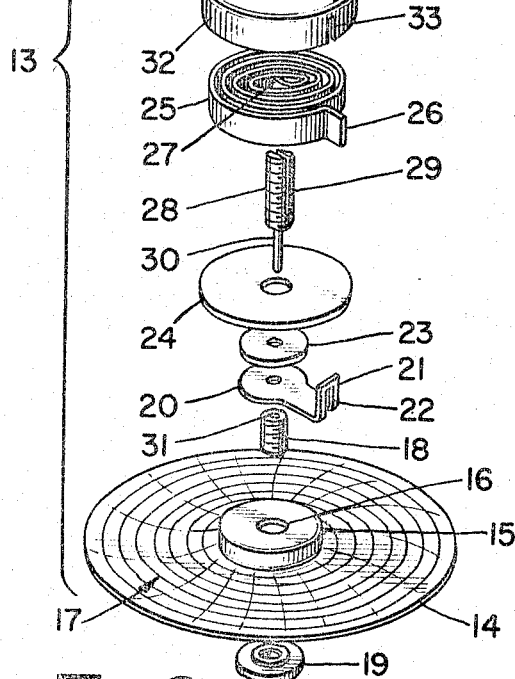
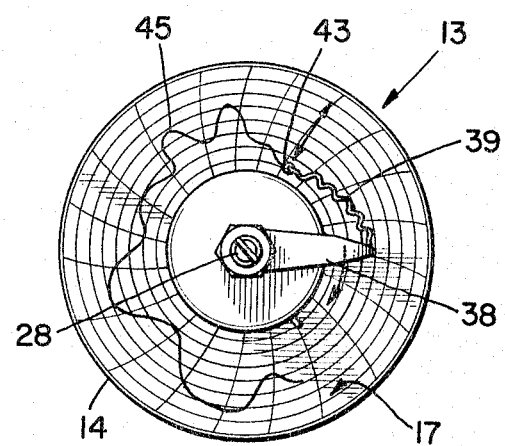
INVENTOR.
GEORGE A. ARGABRITE
BY
*Elliott & Pastoriza*
ATTORNEYS

United States Patent Office 3,319,258
Patented May 9, 1967

3,319,258
HEAT POWERED THERMOGRAPH
George A. Argabrite, 42000 Pacific Coast Highway,
Malibu, Calif. 90265
Filed Aug. 2, 1965, Ser. No. 476,408
7 Claims. (Cl. 346—111)

ABSTRACT OF THE DISCLOSURE

This disclosure relates to a heat recording device of compact configuration for placement next to a part passing through a heat treating oven. The device includes two bimetallic strips one which is slow acting and one which is fast acting. The fast acting strip carries a recording stylus for tracing a path on a recording medium and is connected to the slow acting bimetallic strip for movement in a first direction in response to heating of the slow acting bimetallic strip. The fast acting bimetallic strip in turn moves the recording stylus in a direction different from movement effected by the slow acting bimetallic strip so that a recorded history of temperature variations resulting from action of the fast acting bimetallic strip is provided.

---

This invention relates generally to temperature measuring and recording instruments and more particularly to an improved thermograph for providing a temperature history throughout a given interval of time.

In many industrial processes it is necessary to heat treat various components. Generally, the processes involved are automated to the extent that the components or other parts to be heated are automatically moved on a conveyer system through an oven which is maintained at a desired treating temperature. The length of time that the part is subjected to the temperature in the oven is controlled by the length of the path through the oven and the speed of the conveyer system.

In such processes as the foregoing, it is extremely important from the standpoint of quality control that the part be subjected to a given temperature within prescribed limits throughout the time interval that it traverses the oven. While various temperature sensing devices such as thermocouples are provided in the oven, these temperature sensors will only provide an accurate indication of the temperature at the particular point in the oven that the sensor is located. The actual temperature to which the moving part is subject, however, may vary because of the location of the part on the moving conveyer system and the fact that the part itself is moving through different portions of the oven in which temperature gradients exist. As a consequence, the part or component itself may not always be subject to the temperature of the oven as indicated by the conventional sensing devices disposed in the oven.

With the foregoing considerations in mind, it is a primary object of the present invention to provide an improved thermograph in the form of a compact instrument designed to be placed immediately adjacent to a part to be temperature treated in a manner to move through the oven with the part so that the device itself will be subject to the same temperatures as the part. An inspection of the thermograph after the part has completed its transit through the oven will then provide a record of the exact temperatures to which the part was subjected throughout the time interval of its travel.

More particularly, it is an object to provide a thermograph meeting the foregoing object which is operated wholly in response to temperature in the oven by thermally responsive means incorporated in the device to the end that auxiliary power or active elements are not necessary.

Still another object is to provide a thermograph capable of indicating temperatures up to 900° F. without any deleterious effects on the instrument itself so that it is extremely versatile in operation.

Other objects of this invention are to provide a thermograph which is compact in construction, reliable in operation, and is self-supporting so that it may be placed adjacent to a part for travel with the part through the oven.

A particular object of this invention is to provide a portable thermograph for indicating the temperature history to which a part is subject throughout a given interval of time wherein the temperature history itself is recorded on a scale which is easily readable and which may be maintained in a permanent form for subsequent inspection.

Another object in conjunction with the immediate foregoing object is to provide a thermograph in which the scales themselves may be very easily removed and replaced by an unused scale without having to effect any major disassembly of the apparatus.

Briefly, these and many other objects and advantages of this invention are attained by providing a recording medium preferably in the form of a circular plate having a temperature scale on one surface. A movable means is positioned above the plate and arranged to move in a rotatable manner. This movable means is connected to the recording plate by a slow acting thermally responsive means such as a bi-metallic spiral strip. A recording means such as a stylus, in turn, is connected to the movable means through a fast acting thermally responsive means. In the preferred embodiment, this latter means is made up of a plurality of bi-metallic strips arranged to function in parallel.

The foregoing basic components of the thermograph are so arranged that the slow acting bi-metallic strip means results in a fairly uniform rotation of the movable means which carries the stylus about a circumferential path with respect to the temperature scale on the plate surface. The fast acting bi-metallic strip means, in turn, is responsive to fairly rapid temperature changes to cause the stylus to move in a radial path relative to the plate. Thus, the two thermally responsive means respectively cause movement of the stylus in first and second directions which are different from each other.

With the thermograph as described positioned adjacent to a part which is to be subjected to an oven temperature through a given time interval such as by being passed through the oven or simply placed in the over for the given time interval, the slow acting bi-metallic strip means will gradually be heated resulting in uniform rotative motion of the movable means to carry the stylus over the plate in a circumferential path. Throughout this movement, the fast acting bi-metallic strip means will result in radial movement of the stylus in accordance with minor temperature fluctuations or variations occurring in the vicinity of the part itself thereby providing a graph showing the temperature changes successively along the circumferential path on the scale.

A better understanding of the invention will be had by now referring to a preferred embodiment thereof as illustrated in the accompanying drawings, in which:

FIGURE 1 is a schematic perspective view of an oven and moving belt assembly wherein the thermograph of the present invention could be employed to record the temperature history of a part passed through the oven;

FIGURE 2 is an enlarged exploded perspective view of the basic components making up the thermograph;

FIGURE 3 is a side view partly in cross-section of the elements shown in FIGURE 2 in assembled relationship; and, FIGURE 4 is a top plan view of the thermograph.

Referring first to FIGURE 1, there is schematically illustrated a conveyor belt 10 for transporting a part of component 11 through an oven 12. By this mechanism, the part 11 is subjected to the temperature of the oven 12 through a given time interval in accordance with desired specifications.

In order to provide a temperature history of the exact temperature to which the part 11 is subject throughout its entire transit tine within the oven 12, the thermograph of this invention shown at 13, is disposed as close as is feasible to the part 11. The thermograph will thus travel with the part 11 through the oven 12 and will be subject to substantially the same temperatures as the part.

Referring now to FIGURE 2, the thermograph 13 of FIGURE 1 is illustrated in exploded view.

Starting at the lower portion of the diagram in FIGURE 2, the instrument includes a recording medium preferably in the form of a circular plate 14 formed with an inverted cup shape center portion 15 having a central opening 16. On the upper surface of the plate 14 there is provided a temperature scale in the form of circumferential and generally radially directed lines as shown at 17.

In the preferred embodiment of the invention, the upper scale surface 17 is provided with a heat resistant plastic coating such as "Teflon" which in turn is covered with a markable medium such as lamp black.

Shown above the plate 14 is a bearing screw 18 arranged to cooperate with a manually operable wing nut 19 for securing various components to the plate 14. These components include a locking element 20 having a radially extending arm turning upwardly as at 21 and provided with a slot 22, the purpose for which will become clear as the description proceeds.

Following the element 20 is a washer 23 and insulating disk 24. A slow acting thermally responsive means in the form of a bi-metallic coiled strip 25 is shown above teh disk 24 and has its outer end portion 26 extending radially outwardly and its inner end 27 extending radially inwardly. A screw 28 forming part of a rotatable means is shown above the coil 25 and is provided with a lateral slot 29 and a lower reduced diameter smooth portion 30 constituting a bearing for reception within a bearing receiving opening 31 in the bearing screw 18 disposed immediately above the disk 14.

The elements described thus far are asesmbled as follows: first, the bearing screw 18 is received within the central opening 16 of the plate 14 and is held fixed to the plate. The locking element 20, in turn, is passed over the upper end of the screw 18 together with the washer 23 and disk 24. The coiled bi-metallic strip 25 rests loosely on the disk 24 and has its outer end 26 received in the slot 22 of the locking element 20. The inner end 27, in turn, is received within the slot 29 of the rotatable screw 28, the lower end portion 30 of which is received within the center opening 31 of the bearing screw 18 as described. The wing nut 19 is threaded onto the lower end of the bearing screw 18 extending through the opening 16 to secure the bearing screw 18 and locking element 20 securely to the plate 14 so that these parts are fixed to the plate. As a consequence, the outer end 26 of the bi-metallic coiled strip 25 is held stationary relative to the plate 14. The rotatable portion in the form of the screw 28 secured to the inner end 27 of the coiled strip is free to be rotated by the strip.

Conitnuing on with the various elements illustrated in FIGURE 2, there is provided a partially heat insulating housing 32 having a slot 33 adapted to be received over the coiled structure 25 which, in cooperation with the disk 24, serves to enclose the bi-metallic coiled strip 25. The slot 33 in the periphery of the housing 32 accommodates the outer end 26 of the coil 25 and thus the housing 32 remains stationary relative to the plate 14.

The assembly is completed by a pair of nuts 34 and 35 together with suitable washers 36 and 37 for securing the remaining portion of the rotatable means indicated at 38 to the rotatable screw 28. The movable or rotatable means 38 is connected to first ends of a fast acting thermally responsive means in the form of a plurality of bi-metallic strips 39, 40, 41 and 42. The other ends of these strips, in turn, connect to a recording means in the form of a stylus barrel 43 and stylus 44. Each of the fast acting bi-metallic strips 39 through 42 follow partially circumferential paths in arcuate directions and are generally parallel to each other as shown. Under the influence of heat, these strips tend to straighten and thus cause a radial movement of the stylus marker 44.

When the latter described components are assembled, the upper portion of the rotatable screw 29 passes through the central opening in the housing 32 and the central opening in the rotatable element 38 carrying the fast acting bi-metallic strips. The rotatable element 38 is secured rigidly to the rotatable screw 28 by means of the nuts 34 and 35 which function as a locking means.

FIGURE 3 illustrates the components assembled as described wherein it will be noted that the stylus 44 is positioned to engage the scale 17 on the recording plate 14. The view in FIGURE 3 is taken from the left side of the exploded view of FIGURE 2 with the elements assembled and the various elements themselves are designated by the same reference numerals are employed in FIGURE 2. Thus, it will be evident in FIGURE 3 that the locking element 21 serves to hold the outer end 26 of the slow acting bi-metallic coiled strip 25 stationary with respect to the plate 14. The rotatable screw 28, in turn, carries the rotatable means 38 and, as described in FIGURE 2, is affixed to the inner end of the bi-metallic strip coil 25 so that under the influence of an increasing temperature, the coil will gradually warp. Since however, the outer end 26 is held stationary with respect to the plate, the inner end will cause a rotation of the rotatable screw 28 and element 38 and thus cause the stylus to revolve.

With reference now to FIGURE 4, the direction of movement of the rotatable means 38 is indicated by the arrow as clockwise thereby causing the stylus barrel 43 and stylus extending from the lower end thereof to follow a circumferential path. The fast acting bi-metallic strip elements such as the element 39 illustrated in FIGURE 4 will respond to fast temperature variations by tending to straighted from their arcuate curved configurations thereby moving the stylus barrel and stylus in a general radial direction as indicated by the double headed arrow.

With the foregoing description of the various elements in mind, the entire operation of the thermograph will now be described. With the device assembled as illustrated in FIGURES 3 and 4, it is initially disposed as described heretofore adjacent to a part such as the part 11 to be subjected to a temperature throughout a given time interval as by the oven 12. As the part 11 and thermograph 13 enter the oven 12, the thermograph will be subject to a sudden increase in temperature. As a consequence, however, of the insulated housing 22 and cooperating closure bottom disk 24 described in FIGURE 2, the slow acting bi-metallic strip coil 25 is partially insulated from such sudden increase in temperature. However, the strip will be subject to increasing in temperature slowly, this rate of increase being controlled by the degree of insulation afforded by the housing structure. The arrangement is such that the maximum temperature reached by the coil strip 25 itself will be less than the actual temperature of the oven for the particular time interval of travel of the part through the oven. By so designing the insulated housing and coiled structure in this manner, the slow acting bi-metallic coil strip 25 will respond fairly uniformly to the increasing temperature so that the circumferential path followed by the stylus 44 as a consequence of movement of the rotative member 38 will proceed in a fairly uniform manner.

The fast acting bi-metallic strip elements 39 through 42 as described in FIGURES 2 and 4, however, are extremely sensitive to minor changes in temperature and will thus assume positions indicative of the exact temperature at the part location. Any changes in the temperature as a consequence of temperature gradients in the oven will be responded to by these fast acting metallic strip elements thereby causing the stylus to move in a radial manner as the same travels along the circumferential path. The result will be that the stylus marks the lamp black or other recording medium with a curve such as the curve indicated at 45 in FIGURE 4.

An important feature of this invention resides in the fast acting bi-metallic strip means in the form of the parallel strips 39 through 42. This structure insures that the stylus barrel or casing 43 is held in a vertical position at all times and also insures that proper movement will take place, there being provided four strips acting in parallel thereby providing approximately four times as much moving force as would result from a single one of said strips.

The stylus 44 itself extending from the barrel 43 may be spring loaded if desired so as to be retained in contact with the recording surface.

The rate of circumferential movement as a consequence of the slow acting bi-metallic strip coil 25 is calculated to be such that less than a complete revolution will occur during the particular time interval that the part 11 is exposed to temperature in the oven 12. Therefore, there will be uprovided a complete graphical history on the top recording surface 17 of the plate 14 without any overlapping or duplication.

When the part 11 and thermograph 13 emerge from the right hand end of the oven 12, the temperature history 45 recorded on the temperature scale 17 as illustrated in FIGURE 4 may be permanently maintained by providing a lacquered coating over the plate. The plate itself may then be readily removed from the remaining portion of the instrument by simply unscrewing the wing nut 19 shown in FIGURE 2 and dropping the plate from the bottom of the bearing screw 18. Another plate with an unused scale similar to the scale 17 may then be substituted for the removed plate and the device used for recording another temperature history. The plates themselves are designed for easy stacking as is evidenced by the tapered walls of the cup shape. Further, this cup shape as described in FIGURE 2 will accommodate the wing nut 19 in such a manner that a flat planer bottom surface is provided so that the entire device is self supporting and will remain in a consistent orientation when being used.

From the foregoing description, it will thus be evident that the present invention has provided a greatly improved thermograph which is wholly heat powered to the end that high temperature histories may be recorded and improved quality control realized.

What is claimed is:

1. A heat powered thermograph comprising, in combination: a recording medium; a recording means adapted to move relative to said recording medium, the path of movement of said recording means being recorded on said recording medium; a slow acting thermally responsive means for moving said recording means along said recording medium in a first direction; and a fast acting thermally responsive means supporting said recording means to said slow acting thermally responsive means so as to be moved thereby, said fast acting thermally responsive means in turn moving said recording means in a second direction different from said first direction.

2. A heat powered thermograph comprising, in combination: a recording medium in the form of a circular plate having a temperature scale thereon; a movable means; a slow acting thermally responsive means connected between said movable means and said recording surface and responsive to an increasing temperature to move said movable means in a first direction defining a circumferential path on said plate; a recording means cooperating with said recording medium in a manner to provide an indication on said recording medium of the physical position of said recording means; and a fast acting thermally responsive means connected between said recording means and said movable means and responsive to changes in temperature to move said recording means in a second direction defining a radial path on said plate whereby a history of temperature changes during the time said movable means is moving in said first direction is provided on said recording medium.

3. A heat powered thermograph for providing a temperature history through a given time interval, comprising, in combination: a plate having a temperature scale on one surface; rotatable means mounted above said surface; a slow acting bi-metallic strip means having opposite ends secured respectively to said plate and said rotatable means such that increased temperature gradually warps said slow acting bi-metallic strip means in a manner to rotate said rotatable means relative to said plate at a substantially uniform rate throughout said time interval; a marking stylus positioned to engage and mark said surface when moved relative thereto; and a fast acting bi-metallic strip means connecting said marking stylus to said rotatable means such that relatively rapid temperature changes warp said fast acting bi-metallic strip means in a manner to move said stylus marker in a radial direction relative to said plate, whereby radial movements of said marking stylus are successively displayed over a circumferential path on said surface to provide a graph on said surface to indicate said temperature history.

4. A thermograph according to claim 3, in which said slow acting bi-metallic strip means comprises a bi-metallic strip wound into a spiral coil, the outer end thereof being held fixed relative to said plate and the inner end thereof connecting to said rotatable means.

5. A thermograph according to claim 3, in which said fast acting bi-metallic strip means comprises a plurality of individual bi-metallic strips extending from first ends in arcuate circumferential directions from said rotatable means in parallel relationship, the second ends of said strips connecting to said stylus member, said strips tending to straighten when subject to an increased temperature to thereby move said marking stylus in a radial direction.

6. A thermograph according to claim 3, including a partially heat insulated housing for said slow acting bi-metallic strip means for controlling the rate at which said slow acting bi-metallic strip means heats in a manner such that said slow acting bi-metallic strip means will not reach the temperature to which said thermograph is subject during said time interval.

7. A thermograph according to claim 3, in which said plate is removable so that another plate having an unmarked temperature scale may be substituted for said first mentioned plate.

References Cited by the Examiner

UNITED STATES PATENTS

| | | | |
|---|---|---|---|
| 1,264,478 | 4/1918 | Barstow | 73—343.5 |
| 2,268,006 | 12/1941 | Andersen | 73—363.7 |
| 2,358,102 | 9/1944 | Robertson | 346—77 |
| 2,848,895 | 8/1958 | Bristol | 73—343.5 |

RICHARD B. WILKINSON, *Primary Examiner.*

M. LORCH, *Assistant Examiner.*